United States Patent [19]
Eichenlaub

[11] Patent Number: 4,829,365
[45] Date of Patent: May 9, 1989

[54] AUTOSTEREOSCOPIC DISPLAY WITH ILLUMINATING LINES, LIGHT VALVE AND MASK

[75] Inventor: Jesse B. Eichenlaub, Rochester, N.Y.

[73] Assignee: Dimension Technologies, Inc., Fairport, N.Y.

[21] Appl. No.: 119,907

[22] Filed: Nov. 12, 1987

Related U.S. Application Data

[63] Continuation-in-part of Ser. No. 837,279, Mar. 7, 1986, Pat. No. 4,717,949.

[51] Int. Cl.[4] .................. H04N 15/00; H04N 13/04
[52] U.S. Cl. ............................ 358/3; 358/88; 350/131
[58] Field of Search ............... 358/3, 88, 90, 91, 92; 340/705, 716; 350/131, 133, 134, 139, 141, 143, 132, 138

[56] References Cited

U.S. PATENT DOCUMENTS

| | | | |
|---|---|---|---|
| 2,209,747 | 7/1940 | Eisler | 178/6.5 |
| 3,701,586 | 10/1972 | Goetz | 350/161 |
| 3,746,785 | 7/1973 | Goodrich | 178/7.5 |
| 4,367,486 | 1/1983 | Eichenlaub | 358/88 |
| 4,461,541 | 7/1984 | Duthie | 350/132 |
| 4,484,219 | 11/1984 | Kirk | 358/90 |
| 4,566,031 | 7/1986 | Kirk | 358/90 |
| 4,692,792 | 9/1987 | Street | 358/3 |
| 4,717,949 | 1/1988 | Eichenlaub | 358/3 |

Primary Examiner—James J. Groody
Assistant Examiner—Robert M. Bauer
Attorney, Agent, or Firm—Robert M. Phipps

[57] ABSTRACT

A flat screen autostereoscopic display for bright wide angle stereoscopic images employs a flat screen on which are displayed a plurality of regularly spaced discrete, finite light emitting sites such as thin, vertical light emitting lines. A light valve located in front of the screen forms images by means of varying the transparency of individual pixels arranged in a raster pattern across its surface. A mask in front of the light valve completes the display unit to enhance the parallax effect obtained by the viewer. The screen and light valve are arranged in such a way that an observer sees the light emitting lines through one set of pixels with the left eye and the same lines through a different set of pixels with the right eye. The autostereoscopic effect is obtained when the viewer sees with the right eye and the left eye either alternating rows or alternating columns of pixels.

14 Claims, 8 Drawing Sheets

AUTOSTEREOSCOPIC DISPLAY WITH ILLUMINATING LINES, LIGHT VALVE AND MASK

RELATED APPLICATIONS

This application is a continuation in part of my copending U.S. application Ser. No. 837,279 filed Mar. 7, 1986 now U.S. Pat. No. 4,717,949.

BACKGROUND

1. Field of the Invention

This invention relates to a flat screen autostereoscopic device for use in television, computer graphics, and the like viewing applications.

2. Prior Art

A simple, low cost autostereoscopic system capable of providing clear, bright, high resolution images has long been a goal of the television and computer graphics industry. Previous attempts to produce such a device have experienced the problems of high development costs, expensive equipment, e.g., vibrating components or lenses of various sorts, and bulky size. However, recent developments in the field of transparent flat screen image displays promise low cost, simple and compact autostereoscopic displays which use previously developed components.

U.S. Pat. No. 2,209,747 (Eisler) discloses placing an opaque screen with a plurality of transparent slits in front of a second screen which displays a stereoscopic pair of images made up of alternating strips. Each strip displays a thin vertical section of one of the images. The strips are arranged so that the first displays a section of the right eye image, the second a section of the left eye image, the third a section of the right eye image and so on. The screen with the transparent slits is placed at such a distance in front of the picture display that the observer sees only the right eye strips through the slits with his right eye and only the left eye strips through the slits with his left eye. This technique of displaying stereographic pictures is know as the Hess system. Devices using this technique are very cheap and easy to build. However, for good images the slits have to be very thin, relative to the opaque area between them, and thus a large fraction of the light coming from the display is blocked. This makes it difficult to obtain bright images.

U.S. Pat. No. 4,367,486 (Eichenlaub) discloses how three dimensional images can be viewed with appropriate perspective from many different angles. These images are created with a pinhole aperture or vertical slit that is scanned across a surface situated in front of a cathode ray tube (CRT) that displays images in rapid succession. The patent also discloses how the light blocking problems associated with small apertures could be eliminated by using a similar optical technique, but employing a moving light source in place of a pinhole and a surface that displays transparent images in place of the prior art CRT. This results in bright, clear three dimensional images.

U.S. Pat. No. 4,461,541 (Duthie) discloses an image display system and method that provides two separate and distinct images of a view scene for an observer. The images, taken from adjacent positions looking toward the target scene, are taken from relatively small, acute position angles with respect to the scene. These separate images are then encoded with different polarization in sequence for displaying on a television monitor. The images are prepared for viewing by an observer by focusing the monitored images onto a liquid crystal light valve. Collimated light from a coherent source addresses the light valve providing coherent output therefrom with the encoded images thereon. These images are brought to a Fourier plane and polarized or filtered selectively to provide separately encoded images in alternate frames of polarization. An observer wearing separately polarized lens and viewing an output screen sees a stereoscopic view of the imaged scene.

On the market today are several computer programs designed to be used with conventional CRT display and a set of "blinking" liquid crystal display (LCD) glasses which are worn by the user. Systems of this type are sold by Antics Software and Millenium Ltd of Great Britain. The LCD glasses are synchronized with the CRT screen in such a way that the left lens is transparent (and the right eye is opaque) when the beam is making the first scan of alternate rows, and the right eye is transparent (and the left eye opaque) when the beam is scanning the remaining rows. Thus, the viewer's left eye sees only a left eye image and the right eye sees only the right eye image, and the viewer perceives a scene with depth. The computer programs designed for use with such a system generate left eye images and right eye images on alternate rows of a computer monitor screen instead of on alternate columns of the screen.

There continues to be a need for a simple means of forming and viewing stereoscopic images.

Accordingly it is an object of this invention to provide a flat screen autostereoscopic display device.

It is a further object of this invention to provide a flat screen autostereoscopic display device which is low in cost and easy to manufacture.

Still another object of this invention is to provide a flat screen autostereoscopic display on which only alternate rows of pixels can be seen by the viewer's left eye and the remaining set of alternate rows can be seen only by the viewer's right eye.

Another object of this invention is to provide a flat screen autostereoscopic display device which is capable of providing large, bright, high resolution images and a wide field of view.

SUMMARY OF THE INVENTION

In accordance with this invention there is provided in an autostereoscopic display unit the improvement which comprises (a) a flat surface screen displaying a multiplicity of regularly spaced discrete, finite light emitting sites across its surface, said screen remaining dark between said emitting sites, (b) a light valve in front of and parallel to said screen, said light valve having individual picture elements arranged in a grid pattern across its surface, there being a vertical column of individual picture elements for each light emitting site, said light emitting site being located behind said element, and (c) a mask comprised of alternating opaque and transparent to light sections, there being one transparent and one opaque section so situated in front of each individual picture element of said light valve that due to parallax effect a viewer's right eye can only perceive the light emitting lines through the transparent regions on alternate rows of individual picture elements and a viewer's left eye can only per-

DESCRIPTION OF THE PREFERRED EMBODIMENT

Figure 1:
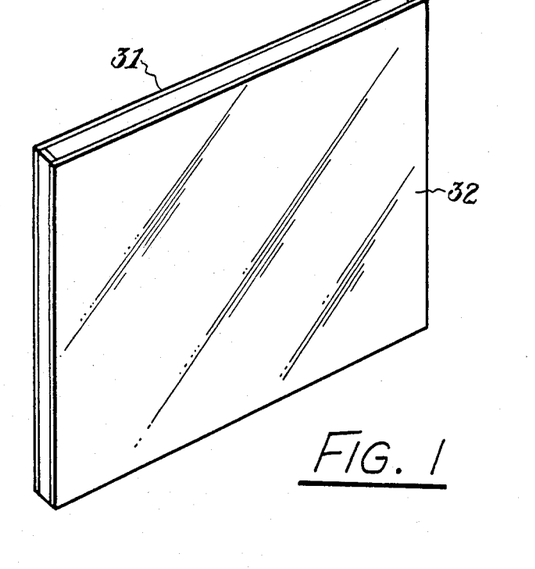
FIG. 1 is a perspective drawing of an autostereoscopic display unit of this invention.

FIG. 1 illustrates the over all invention. A flat surface screen or illumination panel 31 contains a multiplicity of regularly spaced discrete, finite light emitting sites across its surface. These sites can be long vertical lines, a series of short lines arranged in a column, disk shaped, e.g. dots, or squares in columnar arrangement. In this figure there is a plurality (typically about 50 per inch or 20 per cm) of stationary thin vertical lines 35 which emit light and have dark spaces between each line 35. The actual number of lines in any one display can be varied from about 0.5 to about 200 lines per inch or about 0.2 to about 80 lines per cm to achieve a particularly desired result. The diameter of the dots and sides of the squares are about one third ($\frac{1}{3}$) the width of an individual picture element described below. In all cases the light emitting sites are regularly spaced, the dots and squares being in a raster pattern grid.

Figure 2:
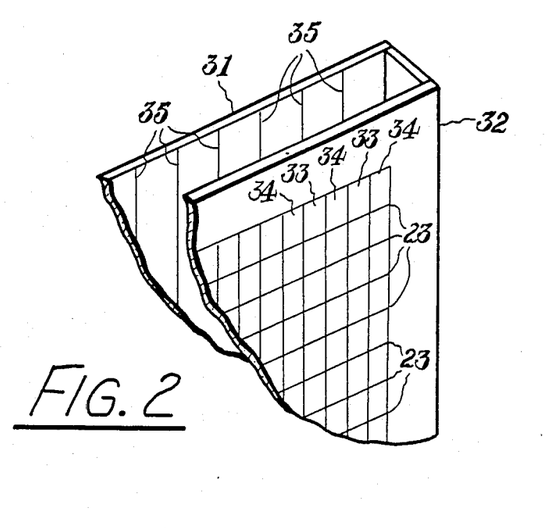
FIG. 2 is an expanded view of a portion of the display unit of FIG. 1.

As shown in FIG. 2 these lines 35 can be continuous or they can be made up of a plurality of either shorter line sources or point sources which are arranged in rows. Lines 35 can be made from (1) fluorescent gas, such as used in fluorescent light tubes, that is trapped in thin channels etched in glass, (2) wire filaments, e.g., tungsten, that emit light when electric current is passed through them due to thermal excitation, or (3) electroluminescent material which emits light because of electron excitation and relaxation when an alternating electric current is passed through it. Lines 35 can also be formed by passing a laser beam through a diffraction grating and projecting the resulting line on to the rear surface (side away from the light valve) of a translucent sheet.

In FIG. 1 the flat light valve 32 is positioned in front of and parallel to the screen or panel 31. Typically the light valve 32 has about the same dimensions as the screen 31. Light valve 32 is capable of displaying transparent images by means of a plurality of individual picture elements, commonly referred to as pixels as shown by rows 23 and columns 33, 34 as shown in FIG. 2. The width of a pixel in a typical display (such as a pocket size receiver or a large wall mounted display) can be varied from about 0.1 to about 2.0 mm, with a typical width being from about 0.36 to about 0.5 mm. The light valve 32 can be made from liquid crystal elements or mechanical elements. Examples of liquid crystal displays are the displays used in many miniature portable television sets. These types of displays are described in detail in an article by P. Andrew Penz, "Nonemissive Displays" in *Flat Panel Displays,* edited by Lawrence E. Tannas, Jr., (Von Nostrand Reinhold Company, New York, NY) which is incorporated herein by reference. Mechanical displays suitable for use in this invention are exemplified by the mechanical displays used in the larger computer controlled flat screen displays. The mechanical displays are described in some detail in U.S. Pat. No. 4,248,501 (Simpson) (also known as the Micro-Curl patent) which is incorporated herein by reference. Other light valve 32 arrangements that may be utilized include those made up of a plurality of individual pockel cells or similar electro-optical devices. Numerous suitable liquid crystal displays are currently commercially available, e.g. Hitachi TM model LM252X. The electronic circuitry associated with the screens of this invention are similar to those used for flat screen television receivers or computer displays. The modulated electromagnetic signal which activates the light valve 32 is transmitted to light valve 32 from a transmitter, e.g., computer or television camera, not shown. When the image is to be displayed in color the electromagnetic signal is separated into signals for each of the three light primary colors (red, green and blue) prior to being sent by the transmitter.

Figure 10:
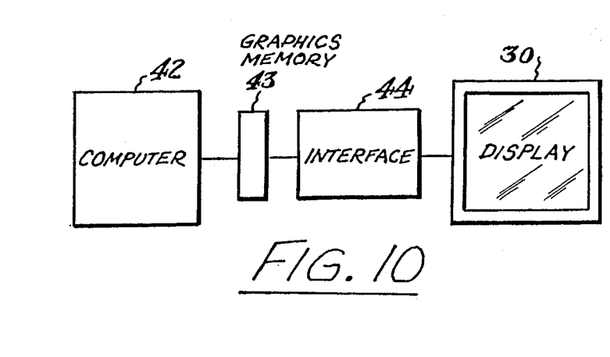
FIG. 10 is a schematic of a computer system wherein the video display is autostereoscopic display unit of FIG. 1.

When the invention is used as a computer generated graphics display light valve 32 would receive signals from the computer by means of a cable, in the same way an ordinary two dimensional display that uses the same type of light valves. The computer's graphics software would be responsible for writing the appropriate images on to the proper lines or vertical columns of pixels 33, 34 and horizontal rows of pixels 23. This arrangement is schematically shown in FIG. 10 wherein the operating computer 42 with graphics memory 43 generates signals which pass through an interface 44 and into the autostereoscopic display unit 30 of FIG. 1.

Figure 8:
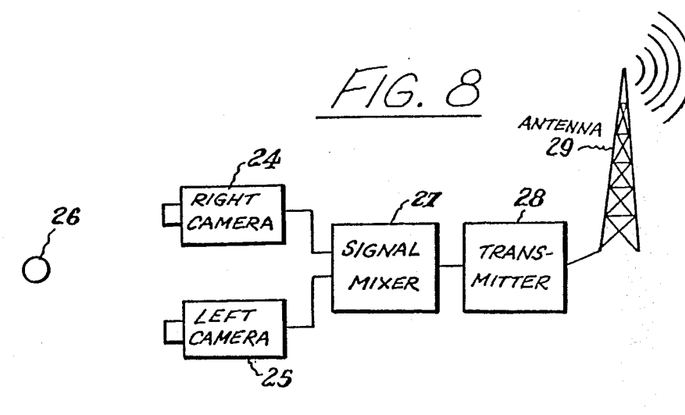
FIG. 8 is a schematic drawing of a system for sending modulated electromagnetic signals to be displayed on the autostereoscopic display of FIG. 1.
Figure 9:
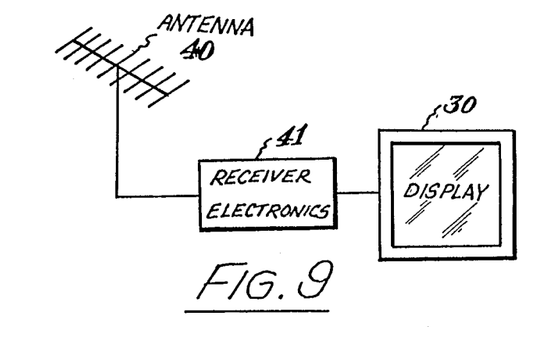
FIG. 9 is a schematic of a television receiving system wherein the screen is the display unit of FIG. 1.

When the invention is used as a display for a television system, input signals would come from two or more television cameras looking at a scene from different points equally spaced along a horizontal line as is commonly practiced in the art. Signals from each television camera would be used to modulate the appropriate set of pixel columns 33, 34. In FIG. 8 a system for sending modulated electromagnetic signals to be displayed on the autostereoscopic display 30 of FIG. 1 is shown. In FIG. 8 the video signals from the right camera 24 and left camera 25, both of which are focused on the same object 26, are fed into a signal mixer 27 which sends the mixed signals to the transmitter 28 that sends the signals to the broadcast antenna 29 for transmission to the air. In FIG. 9 a system for receiving the modulated electromagnetic signals is shown. In FIG. 9 the electromagnetic signals are received by antenna 40 and relayed to a receiver set 41 which supplies the separated signals to the autostereoscopic display 30 of FIG. 1.

In FIG. 2 the pixels as shown by rows 23 and columns 33,34 in light valve 32 are all of the same size. Preferably the pixels as shown by rows 23 and columns 33,34 are arranged in a grid raster pattern in such a way that there are twice as many pixel columns in the horizontal direction as there are emitting lines 35 on screen 31. As will be explained below a larger number of pixels 33, 34 may be employed for each light emitting line 35. Alternating pixel columns 33, 34 in FIG. 3, respectively, display vertical sections of left eye and right eye images of a stereoscopic pair.

The balance of the autostereoscopic display unit is made in a manner typically associated with the manufacture of CRT viewing devices and includes among other things the housing, spacing/retaining frame for flat surface 31 and light valve 32, protective screen in front of light valve 32, and the like.

Figure 3:
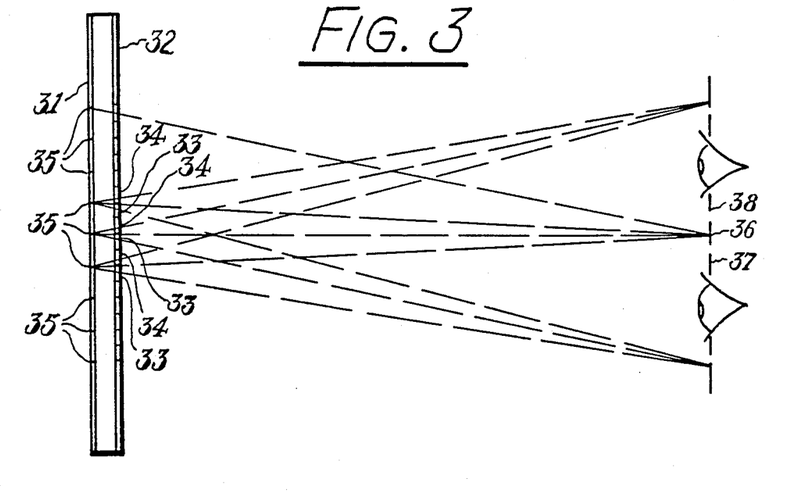
FIG. 3 illustrates the geometry and optical characteristics of the invention when viewing the top of the display unit of FIG. 1.
Figure 4:
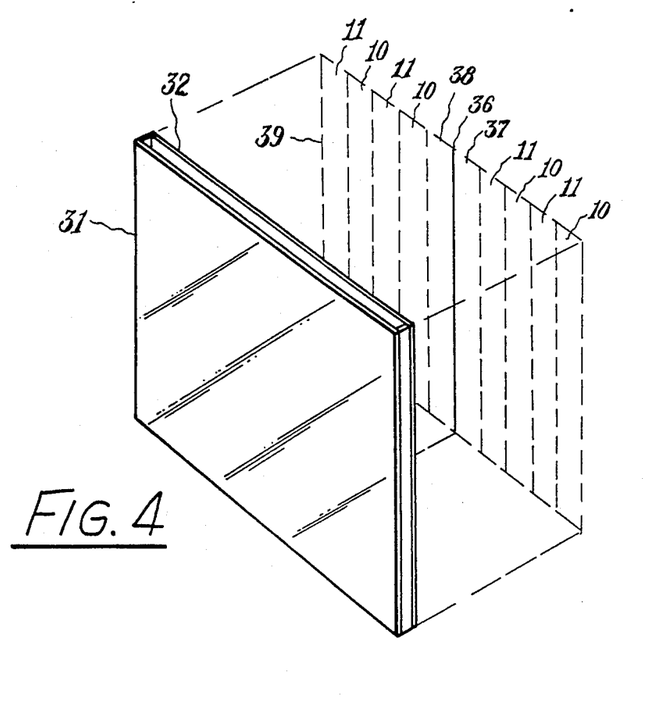
FIG. 4 shows in perspective the geometry and optical characteristics of the display unit of FIG. 1.

FIG. 3 and FIG. 4 illustrate the geometry and optical characteristics of the invention with FIG. 3 being a top view and FIG. 4 a perspective view. The light valve 32 is positioned in such a way that emitting lines 35 in the screen 31 are situated directly behind the boundary between two adjacent pixels 33, 34 as seen from along some vertical line 36 (the center line between the observer's eyes) in front of the display unit. Under these conditions an observer's eye in the viewing zone 37 to the left of the vertical line 36 and within an imaginary plane 39, which is parallel to light valve 32 and contains the vertical line 36, will view all of the emitting lines through pixels 33. Pixels 33 are displaying a left eye image of the stereoscopic pair. This left eye will perceive the left eye image which is being illuminated by the emitting lines 35, but not the right eye image which from the perspective in zone 37 is not being illuminated. In the same manner an observer's eye in zone 38 to the right of line 36 will see all the emitting lines 35 through pixels 34 which are displaying the right eye image of the stereoscopic pair. This eye will perceive only the right eye image. Thus, the observer sitting in front of the display unit with his right eye in zone 38 and his left eye in zone 37 will perceive stereoscopic images.

It can be shown through geometry that the proper spacing between emitting lines 35 is given by the formula $$s = [an(d+m)]/d \qquad (I)$$

wherein
  m = the distance from screen 31 to light valve 32
  n = the width of a single pixel 33 or 34 on light valve 32 or light valve 121
  d = distance along the normal between light valve 32 and line 36 (see FIGS. 3, 4, 6, 12)
  a = the number of columns of pixels for each light site (either 1 for a single column or 2 or more for pairs of columns present)

While d in theory can be any value, in practice when using a pixel of 0.5 mm width d will be a value from 30 to 90. The average viewer will view the display unit at a distance of about 60 cm plus or minus up to about 30 cm from the outer surface of light valve 32. Thus, the typical value of d is between about 30 and about 90. It can be shown geometrically that there are a plurality of zones 10 across plane 39 in which only left eye images are seen, and zones 11 across plane 39 in which only right eye images are seen as shown in FIG. 4. Thus, it is possible for a plurality of observers to sit in front of the display unit with their eyes in appropriate zones and perceive stereoscopic images.

Figure 5:
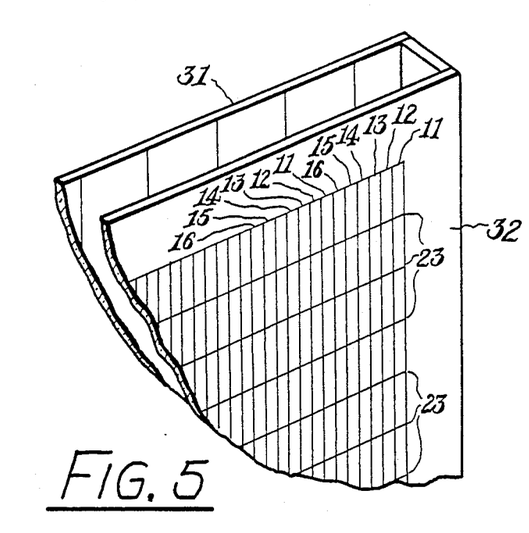
FIG. 5 is a variation of the display unit of FIG. 2 wherein a greater number of individual picture element (pixel) columns are in the light valve display.

The number of rows of horizontal pixels 23 of the light valve 32 and the number of light emitting lines 35 in FIG. 2 and FIG. 5 can be varied depending upon the degree of resolution desired.

Figure 7:
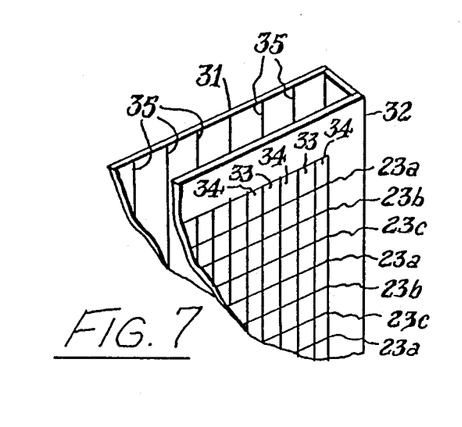
FIG. 7 is an expanded view of a portion of the display unit of FIG. 1 when configured for color displays.

Color images can be displayed if each line of pixels as shown by rows 23 and columns 33, 34 on light valve 32 of FIG. 2 is replaced by pixels with independently controllable transparency and having one of three primary colors. Thus each pixel row 23 is replaced by three rows, namely 23a, 23b and 23c, row 23a being tinted red, row 23b being tinted green and row 23c being tinted blue. Pixel columns 33, 34 will be a repeating sequence of red, green, blue, red, green blue, etc., for the desired length of the column. An expanded view of the display unit when configured for the color displays discussed above is shown in FIG. 7. The display of FIG. 7 is like the display of FIG. 2 except that row 23 has been substituted by pixel rows 23a, 23b and 23c. Full color can then be created in the same manner that such images are created with color dots on a conventional CRT display.

Figure 6:
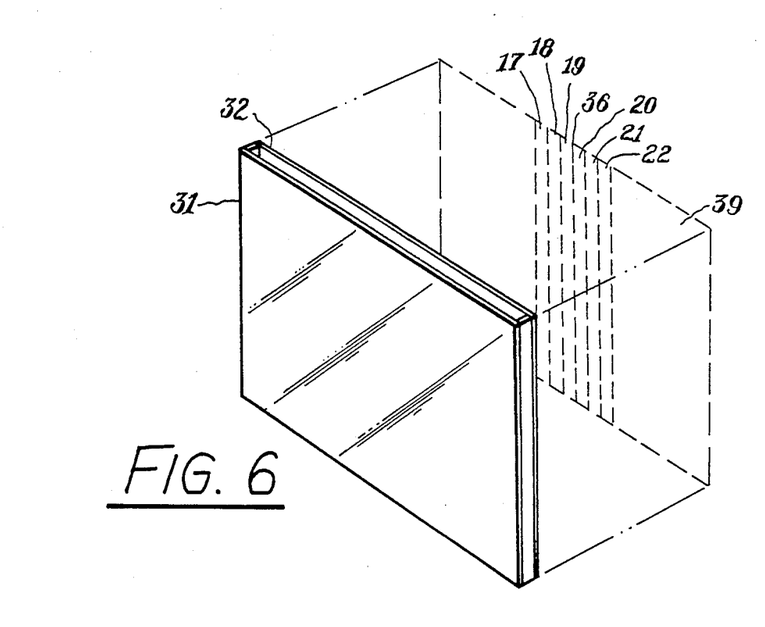
FIG. 6 shows in perspective the geometry and optical characteristics of the display unit of FIG. 5.

It is possible to use more than two columns of pixels in front of each emitting line 35 as shown in FIG. 5. Six columns of pixels 11, 12, 13, 14, 15, 16 are shown in light valve 32 in front of each line 35 in screen 31 of FIG. 5. Other numbers of columns could be used depending on the size of the screen and desired resolution. The increase in column count would result in more than two zones being present in the vicinity of line 36 and are shown in FIG. 6 as zones 17, 18, 19, 20, 21 and 22. Each set of pixel columns 11–16 would display a different perspective view of some scene, with each view being a perspective image of the scene as seen from the center of zones 17–22 respectively. Thus, from each zone an observer's eye would perceive a different perspective view of a scene. In such a case, the observer could view stereoscopic images from any position where his or her eyes are located in two different zones. The observer would thus have the freedom to move his or her head within zones 17–22 without ruining the stereoscopic effect.

Figure 11:
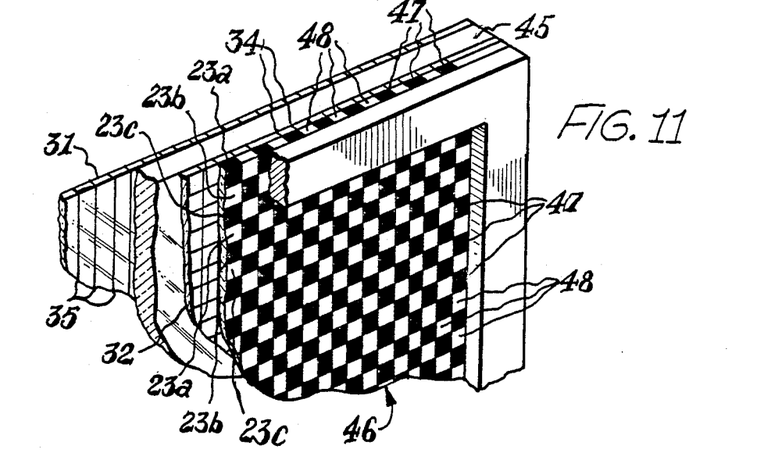
FIG. 11 is an expanded view of a portion of the display unit of FIG. 1 having a mask attached to the viewing side of the light valve.

FIG. 11 is an expanded view of a portion of the display unit of FIG. 1 having a mask 46 attached to the exposed side of the light valve 121. The mask 46 provides system compatibility with three dimensional (3-D) software. The flat surface screen or illumination panel 31 is spaced a part from and parallel to a light valve 121. Optionally the spacing is maintained by a spacer 45. A sheet of clear glass or plastic material of proper thickness 45 makes an ideal spacer between the illumination source 31 and the light valve 121, which is similar to light valve 32 of FIG. 2 except that in light valve 121 there is a single column of vertical pixels for each light emitting line or site.

The mask 46 can be prepared by printing a series of opaque regions in the desired configuration on a transparent plastic sheet. The printing process can be that used in off set printing or xeroxographic reproduction. A typical plastic sheet is about 0.1 to 4 mm in thickness and made of acetate, Mylar TM or other similar plastics. Best results are obtained when the sheet is optically clear. The mask 46 is mounted on the front (visible) side of the light valve 121 by any of a variety of well known mounting techniques in the art. Ideally the printed surface of the mask 46 faces the surface of the light valve 121 upon which it is mounted. The mask 46 is flat, however the location of the transparent and opaque regions of the mask 46 create the wrap around and look around effects obtained.

In FIG. 11 a mask 46 is positioned on the front surface of the light valve 121. The mask consists of a checkerboard pattern of alternating opaque rectangles 47 and transparent rectangles 48. The mask is positioned so that two rectangles situated side by side, one transparent, and one opaque, cover each pixel of the light valve.

Figure 12:
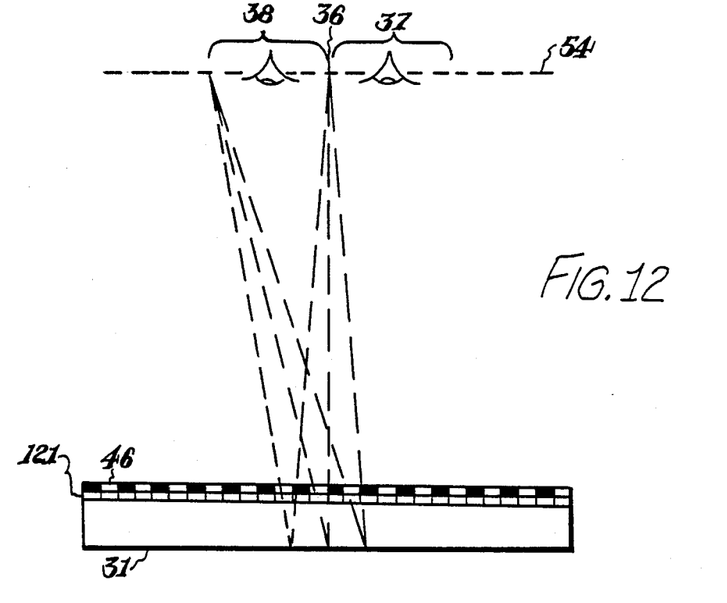
FIG. 12 illustrates the geometry and optical characteristics of the invention when viewing the top of the display unit of FIG. 11.

FIG. 12 illustrates the geometry and optical characteristics of the invention when viewing from the top of the display unit of FIG. 11. The light valve 121 is positioned in such a way that emitting lines 35 on the screen 31 appear to be situated directly behind the center line of each pixel when seen from along some vertical line 36 (the center line between the observer's eyes) in front of the display unit. Under these conditions an observer's eye in the viewing zone 38 to the right of the vertical line 36 and within or near an imaginary plane 54, which is parallel to light valve 121 and contains the vertical line 36, will view all the emitting lines through the right half of each pixel. The observer will thus be able to see the lines through those pixels with a transparent mask rectangle on their right side. The observer will not be able to see the lines through those pixels with an opaque square in the right side. The observer will thus be able to see the lines only through alternate horizontal rows of pixels 23a with the right eye. If pixel rows 23a are displaying sections of a right eye image of a stereoscopic pair, the observer's right eye will see the right eye image. Likewise, the observer's left eye, in zone 37 to the left of line 36 will see all the emitting lines through those transparent rectangles which are on the left sides of the pixels. The left eye will thus see the lines only through those alternate rows of pixels 23b through which the right eye cannot see the lines. If rows 23b display a left eye image, the left eye will see only this left eye image while his right eye sees the right eye image, and will thus perceive a stereoscopic image.

Figure 13:
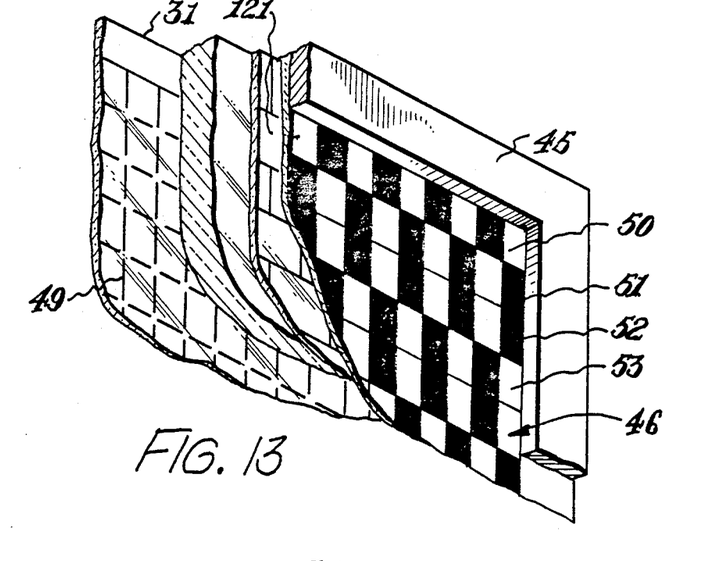
FIG. 13 is an expanded view of a portion of the display unit of FIG. 1 when configured for color displays with offset rows of colored pixels.

When building color display of this type the manufacturer may be faced with the need to use liquid crystal displays with interleaved color pixels. In this arrangement, the pixels of each row are offset from each other by ½ their width, as is shown in FIG. 13. Red, blue and green pixels are arranged in small triangles made up of three pixels, one of each color.

FIG. 13 shows a light emitting line and mask arrangement that can be used with such a pixel arrangement. Flat illuminating screen 31 displays a plurality of line elements 49. Each element is roughly the same length as a pixel of light valve 121. The pixels 23 in alternating rows are offset from each other by half the distance between two adjacent illuminating lines 49. The lines 49 are spaced apart by the proper distance so that each seems to be directly behind a pixel as seen from line 36. One illuminating line 49 appears behind each pixel of light valve 121.

A mask 46 with the transparent and opaque pattern shown in FIG. 13 is placed at in front of screen 31. The mask is positioned so that, as seen from line 36, each line element 49 on screen 31 appears to be behind the border of a light square and a dark square on mask 46. Note that with this mask pattern, the observer's left eye sees lines only through alternating groups of two rows 50,51 of mask 46 and the right eye sees lines only through the other set of alternating groups 52,53 of mask 46. As before, those rows visible to the right eye are used to show a right eye image and those visible to the left eye show a left eye image.

It is possible to use a mask arrangement to achieve a "look around" capability in which a different perspective view of a scene is visible from each of several zones across imaginary plane 54 of FIG. 12. This gives the viewer a hologram like effect in which the viewer can move this head to look around corners and so forth. In general, the arrangement described in my copending application is superior for producing this effect, because no light is lost by being blocked by a mask. However, a mask arrangement has the advantage of a much shorter spacing between the line display 31 and the mask 46, which reduces weight considerably. This is important for units designed for rugged use in weight critical environments, such as aircraft.

Figure 14:
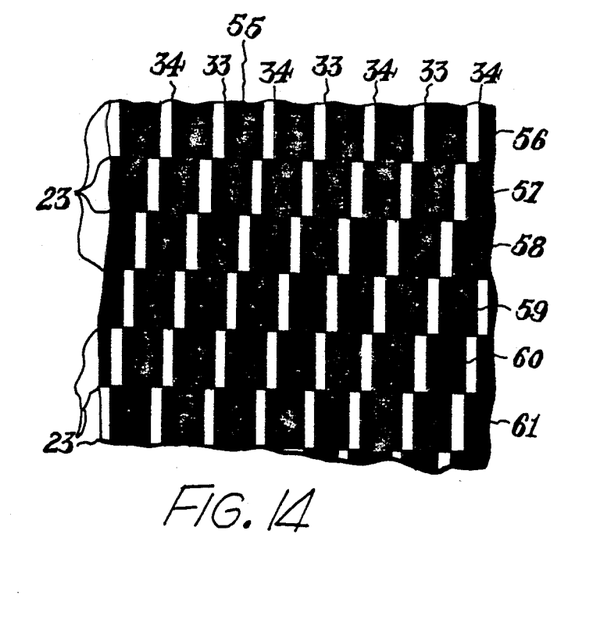
FIG. 14 is a front view of a mask with look around capability.

FIG. 14 shows the mask arrangement to be used for the look around three dimension (3D) version. The mask 55 contains a plurality of relatively thin transparent rectangles with opaque regions between them. In FIG. 14 the rectangles are one sixth (1/6) as wide as the pixels 23, 33, 34. Other widths could be used, as is explained below. The mask is placed in front of an illuminating line and light valve arrangement identical to that of FIG. 2. One line is situated behind each column of pixels 33,34 and ideally is positioned so that, from imaginary line 54 in FIG. 12 the lines appear to bisect the pixels. The mask is placed so that one transparent rectangle is in front of each pixel. Furthermore, the mask is placed so that in row 56 the transparent rectangles are at the right edge of the pixels. In each subsequent row 57 through 3 the rectangles are shifted leftward by one sixth of a rectangle width, until in row 33 the rectangles are at the left edges of the pixels. In the next row, not shown, the rectangles are again at the right edges of the pixels and the pattern repeats.

Figure 15:
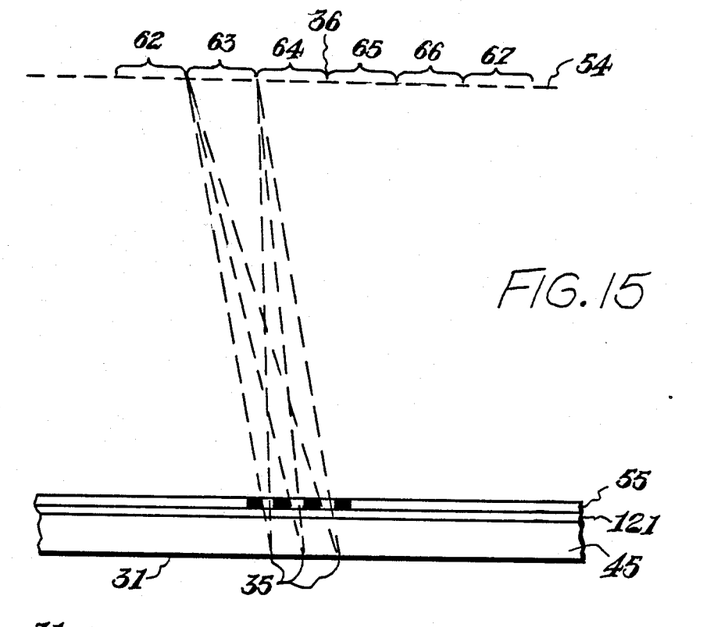
FIG. 15 illustrates the geometry and optical characteristics of the invention when viewing the top of the display unit of FIG. 14.

FIG. 15 illustrates with a top view the geometry of the invention when used with the mask of FIG. 14. The rectangles are placed so that the illuminating lines 35 are visible through different rows of pixels from different zones 62 through 67 at imaginary plane 54. With the mask shown in FIG. 14 the line behind row 56 would be visible from zone 62, line behind row 57 visible from zone 63 and so on. After every six rows the pattern repeats, with row 40 being visible from zone 62 and row 41 being visible from zone 63 and so on. The observer can see the illuminating lines only from successive zones 56 in front of the device. Thus if pixel row 28 and each sixth succeeding row were to display a scene with perspective appropriate to an observer in zone 62 and pixel row 29 and the sixth succeeding row were used to display the same scene with perspective as seen from zone 63 and so on, the observer near place 24 would perceive an image that seemed to change its perspective as the observer moved his head from side to side, just as a real three dimensional object would.

Although a mask designed for six viewing zones is shown, virtually any number of zones could be produced by varying the width of the rectangles on the mask. If N zones are desired, then each rectangle must have a width of at most 1/N times the width of the pixels 33,34. Their arrangement could still be identical to FIG. 14. Generally, the more zones there are and the thinner they are, the more realistic is the three dimensional scene.

It is possible to produce color pictures with the mask 46 if the light valve possesses columns or rows of alternating red, blue and green tinted pixels, as shown in FIG. 5.

It may be apparent to the reader that many possible patterns of lines and transparent rectangles may be used to ensure that certain lines or pixels can be visible only in certain zones in front of the invention. For example, one could make alternate diagonal rows visible to the left eye and the remaining alternate diagonal rows visible to the right eye by placing the appropriate mask rectangles over each pixel.

Figure 16:
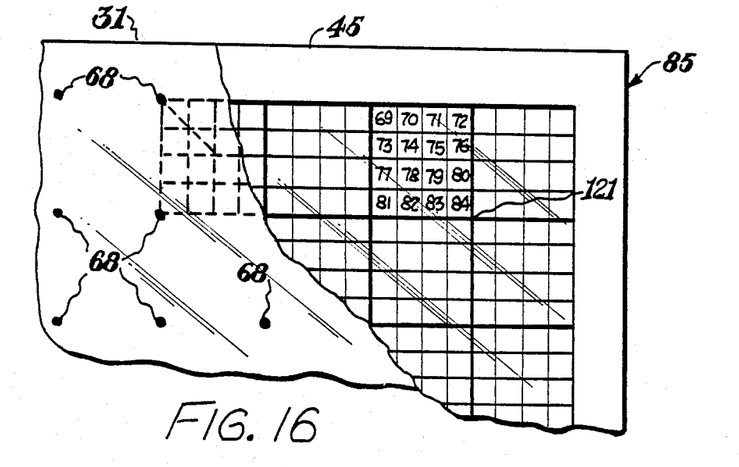
FIG. 16 is an expanded view of a portion of the display unit of FIG. 1 configured for parallax effect in both vertical and horizontal directions.

It is also possible to produce three dimensional display that produces parallax in both the vertical and horizontal directions using a light emitting pattern behind a light valve or light valve and mask combination. FIG. 16 illustrates this version of the system.

In FIG. 16 display panel 85 has light valve 32 which is spaced apart from and parallel to an illumination screen 31, possessing a plurality of small, light emitting regions 68 in a raster pattern across its surface. A group of 16 pixels 69 through 84, consisting of 4 rows and 4 columns, is placed in front of each light emitting region 68. The pixels in each group in front of each region are mutually exclusive from other pixels in other groups in front of other light emitting regions (or dots) 68.

Figure 17:
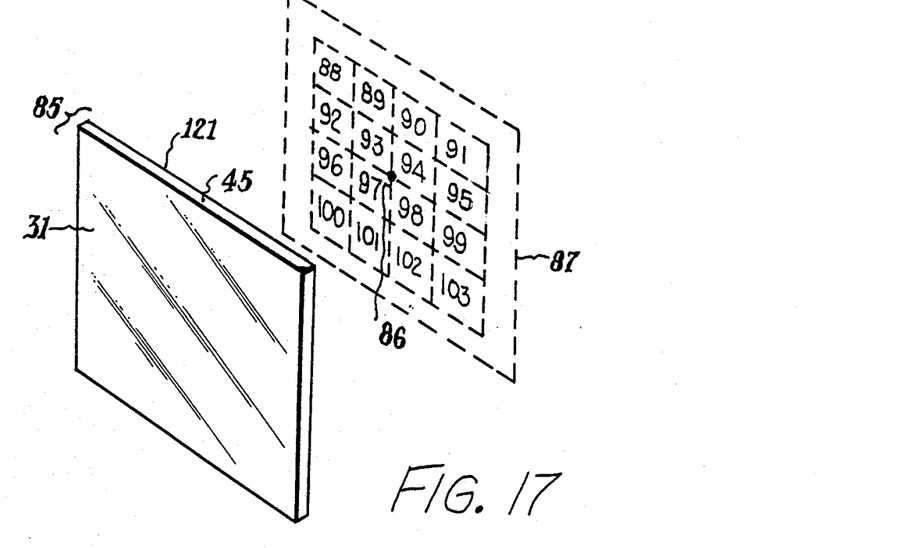
FIG. 17 illustrates the geometry and optical characteristics of the display unit of FIG. 16.

FIG. 17 illustrates the geometry of display panel 85 shown in FIG. 16. The spacing between the dots, and the distance between light valve 121 and illumination panel 31 is such that, from a point 86 directly in front of the display and in an imaginary plane 87 such that the point 86 represents the mid point between a viewer's two eyes, each dot is seen to be situated directly behind the center of its group of pixels 69 through 84. A group of 16 zones 88 through 103 exists in place 87 in front of the display 85. From zone 88 each dot 68 appears to be situated behind pixels 69 from zone 89 each dot 68 appears to be situated behind pixels 70 and so forth. The set of pixels 69 displays an image of a scene with the proper perspective that would arise from viewing it from the center of zone 88, the set of pixels 70 display the same scene with a perspective appropriate to its appearance from the center of zone 89 and so forth. Thus, as a person moves his head within the zones 88 through 103 the perspective of the scene seems to change as the person moves up and down, or sideways, just as the perspective of a real object would.

Figure 18:
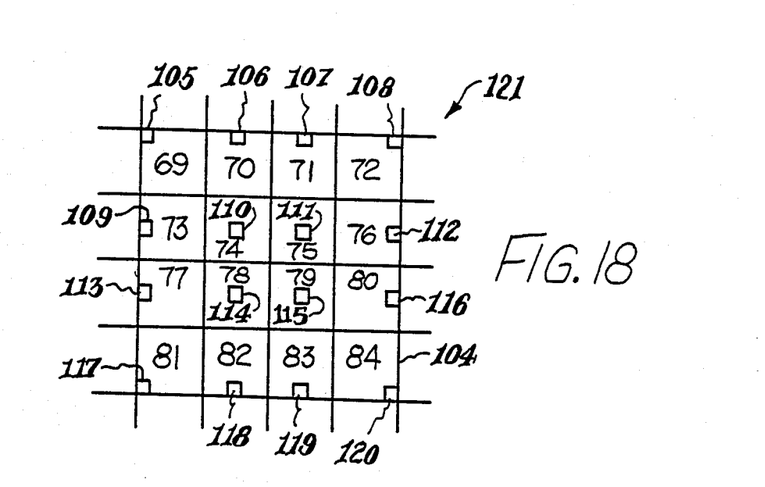
FIG. 18 is a view of a portion of a mask for the display unit of FIG. 16.

FIG. 18 illustrates a mask that can be used with the display panel 85 of FIG. 16 to form a display with parallax in both the horizontal and vertical directions. A portion of light valve 32 of display panel 85 containing one group of 16 pixels 69 through 84 is shown. There is one illuminated point 86 behind each pixel. A mask 104 is placed at the light valve 32 with transparent regions 105 through 120 are spaced so that only a fraction of each pixel 69 through 84 is covered by a transparent opening. Furthermore, the transparent regions cover different sections of each pixel or set of pixels. In FIG. 18 the transparent region at pixel 69 allows light to escape from the upper corner region of the pixel. These region allow the dots behind these pixels to be seen only from zones 88 at plane 87 of FIG. 17. Likewise, the transparent regions in from the pixels 70 allow light to escape through the transparent square closer to the center of the top of each pixel, allowing the dots behind these pixels to be seen only within zones 89 at plane 87. There in only one set of pixels 69 through 84 visible in each of the zones 88 through 103. As before, sets of pixels 69 display an image with a perspective appropriate to the perspective as seen from zone 88 and so on.

Although FIGS. 12 through 14 illustrate the use of 16 pixels in front of each dot 86 and 16 zones in plane 87 any number of pixels can be placed in front of each region to create any number of zones at plane 87. While it is convenient to use a square grouping of pixels as shown in these figures, other configurations may be employed.

The foregoing configurations and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. In an autostereoscopic display unit the improvement which comprises
    (a) a flat surface screen displaying a multiplicity of regularly spaced discrete, finite light emitting sites across its surface, said screen remaining dark between said emitting sites,
    (b) a light valve in front of and parallel to said screen, said light valve having individual picture elements arranged in a grid pattern across its surface, there being a vertical column of individual picture elements for each light emitting site, said light emitting site being located behind said element, and
    (c) a mask comprised of alternating opaque and transparent to light sections, there being one transparent and one opaque section so situated in front of each individual picture element of said light valve whereby due to parallax effect a viewer's right eye can only perceive the light emitting lines through the transparent regions on alternate rows of individual picture elements and a viewer's left eye can only perceive the light emitting lines through the transparent regions on the remaining rows of individual picture elements.

2. The display unit of claim 1 wherein the light emitting sites are light emitting lines.

3. The display unit of claim 2 wherein the display is in color and each horizontal row of the grid pattern of individual picture elements is replaced by three rows of individual picture elements, each one of the three rows of elements being tinted for a different one of the three primary colors.

4. The display unit of claim 2 wherein the space between two successive light emitting lines is determined according to the formula $$s = [an(d+m)]/d$$

wherein m is the distance from the screen to the light valve, n is the width of a single vertical individual picture element, s is the distance between two successive light emitting lines, a is the number of individual picture elements associated with each light emitting line and d is an integer between 30 and 90.

5. The display of claim 2 used in a television receiving system as the visual display.

6. The display of claim 2 used in a computer system as the graphics display.

7. The display unit of claim 1 wherein the light emitting sites are disk or square shaped and arranged in a raster pattern grid.

8. A method of displaying autostereoscopic images which comprises sending from a transmitter a series of modulated electromagnetic signals that are received by a light valve in a display unit wherein the light valve is in front of and parallel to a flat surface screen, said flat surface screen displaying a multiplicity of regularly spaced discrete, finite light emitting sites across its surface, said screen remaining dark between said emitting sites, said light valve in front of and parallel to said screen, said light valve having individual picture elements arranged in a grid pattern across its surface, there being a vertical column of individual picture elements for each light emitting site, said light emitting site being located behind said element, and said display unit has a mask comprised of alternating opaque and transparent to light sections, there being one transparent and one opaque section so situated in front of each individual picture element of said light valve whereby due to parallax effect a viewer's right eye can only perceive the light emitting lines through the transparent regions on alternate rows of individual picture elements and a viewer's left eye can only perceive the light emitting lines through the transparent regions on the remaining rows of individual picture elements.

9. The method of claim 8 wherein the light emitting sites are vertical light emitting lines.

10. The method of claim 8 wherein the images are displayed in color by separating the electromagnetic signals into separate signals for each of the three light primary colors and each horizontal row of the grid pattern of individual picture elements is replaced by three rows of individual picture elements, each one of the three rows of elements being tinted for a different one of the three primary colors.

11. The method of claim 8 wherein the electromagnetic signal is generated by a computer program.

12. The method of claim 8 wherein the electromagnetic signal is generated by a television signal.

13. The method of claim 8 wherein the light emitting sites are disk or square shaped and arranged in a raster pattern grid.

14. In an autostereoscopic display unit the improvement which comprises (a) a flat surface screen displaying a multiplicity of regularly spaced discrete, finite light emitting sites across its surface, said screen remaining dark between said emitting sites, and (b) a light valve in front of and parallel to said screen, said light valve having individual picture elements arranged in a grid pattern across its surface, there being at least one pair of vertical columns of individual picture elements for each light emitting site, said light emitting site being located behind the boundary of said pair, said light emitting sites being disk or square shaped and arranged in a raster pattern grid.

* * * * *